(12) United States Patent
Wirth

(10) Patent No.: US 6,799,550 B2
(45) Date of Patent: Oct. 5, 2004

(54) SPARK-IGNITION ENGINE HAVING DIRECT FUEL INJECTION

(75) Inventor: Martin Wirth, Remscheid (DE)

(73) Assignee: Ford Global Technologies, LLC, Dearborn, MI (US)

( * ) Notice: Subject to any disclaimer, the term of this patent is extended or adjusted under 35 U.S.C. 154(b) by 74 days.

(21) Appl. No.: 10/318,844

(22) Filed: Dec. 13, 2002

(65) Prior Publication Data

US 2003/0145823 A1 Aug. 7, 2003

(30) Foreign Application Priority Data

Dec. 14, 2001 (EP) .............................................. 01129782

(51) Int. Cl.[7] .............................. F02B 5/00; F02F 1/36
(52) U.S. Cl. ........................ 123/276; 123/301; 123/305; 123/309; 123/41.82 R
(58) Field of Search ................................ 123/276, 279, 123/285, 301, 305, 309, 41.82 R, 193.5, 568.14, 295, 299, 298, 300, 443, 90.15, 531; 239/533.12

(56) References Cited

U.S. PATENT DOCUMENTS

| | | | | |
|---|---|---|---|---|
| 4,846,114 A | * | 7/1989 | List .............................. | 123/26 |
| 5,195,482 A | * | 3/1993 | Smith ...................... | 123/198 A |
| 5,622,150 A | * | 4/1997 | Fraidl et al. ................. | 123/307 |
| 5,785,028 A | | 7/1998 | Anderson et al. | |
| 5,813,385 A | * | 9/1998 | Yamauchi et al. .......... | 123/276 |
| 5,960,767 A | * | 10/1999 | Akimoto et al. ............. | 123/298 |
| 5,967,114 A | * | 10/1999 | Yasuoka ...................... | 123/295 |
| 5,983,843 A | * | 11/1999 | Suzuki et al. ......... | 123/41.82 R |
| 5,983,853 A | * | 11/1999 | Roessler et al. ............. | 123/295 |
| 6,032,637 A | * | 3/2000 | Mamiya et al. .............. | 123/295 |
| 6,055,955 A | * | 5/2000 | Benedikt et al. ............. | 123/259 |
| 6,076,498 A | | 6/2000 | Monnier | |
| 6,095,114 A | * | 8/2000 | Horie et al. ................. | 123/298 |
| 6,170,457 B1 | | 1/2001 | Grajkowski | |
| 6,295,955 B1 | * | 10/2001 | Kato et al. ............. | 123/41.82 R |
| 6,386,175 B2 | * | 5/2002 | Yang ........................... | 123/298 |
| 6,418,905 B1 | * | 7/2002 | Baudlot et al. .............. | 123/301 |
| 6,470,850 B1 | * | 10/2002 | Sasaki et al. ................ | 123/305 |
| 6,543,408 B1 | * | 4/2003 | Ernst et al. .................. | 123/295 |
| 6,561,158 B2 | * | 5/2003 | Yoshida et al. .............. | 123/295 |
| 6,612,272 B2 | * | 9/2003 | Kato et al. ............. | 123/41.82 R |
| 6,651,615 B2 | * | 11/2003 | Suzuki et al. ................ | 123/305 |
| 2001/0045200 A1 | * | 11/2001 | Urushihara et al. .......... | 123/295 |
| 2002/0014219 A1 | * | 2/2002 | Suzuki et al. ................ | 123/305 |
| 2002/0079389 A1 | * | 6/2002 | Abe et al. ................. | 239/585.1 |
| 2002/0179039 A1 | * | 12/2002 | Wuerfel ....................... | 123/298 |
| 2003/0066508 A1 | * | 4/2003 | Nakayama et al. .......... | 123/295 |
| 2003/0140891 A1 | * | 7/2003 | Cathcart et al. ............. | 123/301 |

FOREIGN PATENT DOCUMENTS

| | | |
|---|---|---|
| DE | 3019330 | 11/1981 |
| EP | 0889225 | 1/1999 |
| EP | 1048833 | 11/2000 |
| EP | 1148226 | 10/2001 |

* cited by examiner

*Primary Examiner*—Hai Huynh

(57) ABSTRACT

The invention relates to a spark-ignition engine having direct fuel injection, the fuel injector (2) and the spark plug (3) being arranged centrally on the upper side of the combustion chamber (1). The fuel injector produces an asymmetrical injection volume, so that the electrodes of the spark plug (3) are not directly affected by liquid fuel. The electrodes are, however, situated in a region reached by evaporating fuel.

3 Claims, 1 Drawing Sheet

SPARK-IGNITION ENGINE HAVING DIRECT FUEL INJECTION

FIELD OF THE INVENTION

The invention relates to a method for producing a particular air/fuel mixture in the combustion chamber of an internal combustion engine. Such engine has direct fuel injection, an air inlet which induces an inclined swirling motion to the air inducted into the combustion chamber, a fuel injector arranged centrally on the upper side of the combustion chamber for injecting a fuel spray into an injection volume, and a spark plug which is arranged centrally on the upper side of the combustion chamber and the electrodes of which are situated outside the injection jets of the fuel injector.

BACKGROUND OF THE INVENTION

A gasoline, four-stroke engine having direct fuel injection, in which stratified lean operation is possible, is known from the prior art. With operation of this type, pumping losses of the engine can be reduced and therefore—in comparison with conventional engine technology having port fuel injection and homogeneous stoichiometric operation—considerable fuel efficiency improvements can be obtained. Different construction principles which differ with regard to the system components are known for internal combustion engines of this type. The differences include, for example, the arrangement of the injectors and of the spark plugs, the number of inlet and outlet valves, the geometrical shape of the combustion chamber and of the piston, and the movement of air in the combustion chamber, which is brought about with the aid of the shape of the inlet port.

Depending on the arrangement of the components and on the method for forming the stratified fuel/air mixture, combustion systems are classified as wall-guided, air-guided or jet-guided systems. The systems which are currently under production are usually wall-guided systems having a centrally arranged spark plug and a laterally fixed injector. The fuel jet is conducted by the walls or a depression in the piston to the ignition point. This configuration suffers compromises with regard to the timing control of injection and ignition, thereby leading to losses in the thermal efficiency of the engine.

The same arrangement is used for air-guided systems, except that direct impact of the injected fuel jet onto the surface of the piston is prevented to the extent possible. For this purpose, the injected fuel jet is deflected by the movement of air in the cylinder toward the ignition point. However, systems of this type are difficult to optimize, since the air motion and turbulence level depend on the rotational speed of the engine.

Jet-guided systems constitute the most vigorous approach, in which the spark plug is arranged in the direct vicinity of the injector. A jet-guided system of this type is known, for example from U.S. Pat. No. 5,941,207. In this case, the stratified mixture reaches the ignition point by the injection jet being dispersed independently of the geometry of the combustion chamber and the movement of air. This makes possible the maximum thermal efficiency of an unthrottled, lean gasoline combustion process and also minimized exhaust-gas emissions. However, a fundamental problem of this approach resides in the durability of the fuel injector and of the spark plug due to the formation of deposits on the electrodes of the spark plug and due to coking of the injector because of insufficient cooling.

SUMMARY OF THE INVENTION

The internal combustion engine according to the invention having direct fuel injection comprises at least one cylinder having lateral cylinder walls and a cylinder head and a piston arranged in the cylinder, the piston and the cylinder together bounding a combustion chamber. The combustion chamber has at least one air inlet which is designed and is arranged on the cylinder in such a manner that when inlet air is admitted a preferably inclined swirling movement of the inlet air arises in the combustion chamber. A swirling movement is characterized by a vortex rotating about the cylinder axis or stroke axis of the piston.

Furthermore, in the internal combustion engine a fuel injector for injecting a fuel jet into an injection volume and an injection device are arranged centrally on the upper side of the combustion chamber, i.e., in the cylinder head, the electrodes of the injection device being situated outside the abovementioned injection volume of the fuel injector. The electrodes are not therefore directly affected by the injected fuel. The injection volume is defined as the region of space which is reached by the liquid particles of the injected fuel. The internal combustion engine is distinguished by the fact that the abovementioned injection volume is asymmetrical, the injection volume furthermore being shaped and aligned within the combustion chamber in such a manner that the electrodes of the spark plug are situated in a volume occupied by the fuel spray arising from evaporating fuel during and after the injection.

The internal combustion engine designed In the above-described manner has the advantage of a long service life since sooty carbon deposits on the spark plug and coking of the fuel injector are prevented or minimized because the spark plug is not directly affected by fuel droplets as the electrodes of the spark plug are situated outside the injection volume, i.e., the volume containing liquid fuel droplets. At the same time, however, a reliable and robust ignition of the air/fuel mixture is ensured as the electrodes are arranged in a region occupied by evaporated fuel.

The electrodes of the spark plug are preferably arranged in a region which is brushed over during rotation of the asymmetrical injection volume about the cylinder axis or stroke axis of the piston. Such a rotation of the injection volume is ensured by the swirling movement of the inlet air, which movement is produced by the design of the air inlet.

According to a development of the invention, the upper side of the combustion chamber, i.e., the cylinder head, is in the form of a pentroof. This shape of the cylinder head permits accommodation of the injector and the spark plug favorably.

Furthermore, the upper side of the piston can have a trough-shaped depression which is used in an advantageous manner to deflect the injected fuel and to distribute it in the combustion chamber.

According to a development of the invention, the at least one cylinder of the internal combustion engine has at least one inlet valve and at least one outlet valve, the abovementioned valves being actuated variably so that exhaust gases can be trapped in the cylinder, this is sometimes called internal exhaust-gas recirculation system. Variable valve timing (VVT) mechanisms, which permit adjustment of the opening and/or closing times of the valves are known in the art. In the ease of internal exhaust-gas recirculation, a late closing of the outlet valves ensures that part of the combusted exhaust gases flows back into the combustion chamber to produce more favorable conditions there for the following operating cycle.

The fuel injector is surrounded within the cylinder head on the upper side of the combustion chamber by a coolant jacket. Such a complete enclosure of the fuel injector with a coolant jacket is possible, in particular, by the asymmetrical shape of the injection volume, said shape, for its part, permitting an inclined installation of the fuel injector. This then produces the required space and distance between the injector and the spark plug for the coolant jacket. Cooling of the fuel injector advantageously prevents coking of the fuel injector.

The invention furthermore relates to a method for producing an air/fuel mixture in the combustion chamber of an internal combustion engine, a preferably inclined swirling movement being produced in the combustion chamber, and a fuel jet being injected into an injection volume in the combustion chamber. The method is distinguished by the injection volume being asymmetrical and the electrodes of a spark plug being situated outside the injection volume and inside a volume occupied by evaporated fuel. The electrodes are preferably situated in a region which the injection volume brushes over during rotation about the cylinder axis.

Advantageously, by this method, the electrodes are not directly affected by the liquid fuel in the fuel jet. Yet, ignition is ensured since by fuel evaporation and/or by the swirling movement of the inlet air about the cylinder axis, evaporated fuel enters into the ignition region, i.e., the location of the electrodes.

In the case of the abovementioned method, a stratified air/fuel mixture is produced in the combustion chamber. A stratified mixture of this type makes possible high, ignitable fuel concentrations in the region of the spark plug while the remaining volume of the combustion chamber is filled with a mixture of lower fuel concentration. This permits, in particular, efficient lean operation of the internal combustion engine.

According to a development of the method, during the induction stroke of the internal combustion engine a first quantity of fuel is injected into the combustion chamber to produce a homogeneous air/fuel mixture. During the subsequent compression stroke, a second quantity of fuel is injected to produce a stratified mixture. The division of the entire injected quantity of fuel into two parts provides an additional parameter for controlling engine operation which can be used to optimize the operation of the internal combustion engine.

Advantages provided by the present invention are an improved method for producing an air/fuel mixture. The engine and method ensure a longer service life and operability of the injector and spark plug.

Furthermore, the method is preferably implemented in such a manner that in all of the operating modes of the internal combustion engine the same flow ratios are produced in the combustion chamber. These flow conditions can be prescribed by structurally comparatively simple and unchangeable measures, so that overall a cost-effective and robust construction of the internal combustion engine can be obtained.

BRIEF DESCRIPTION OF THE DRAWING

The invention will be explained in greater detail below by way of example with reference to the drawing.

DETAILED DESCRIPTION

Figure 1:
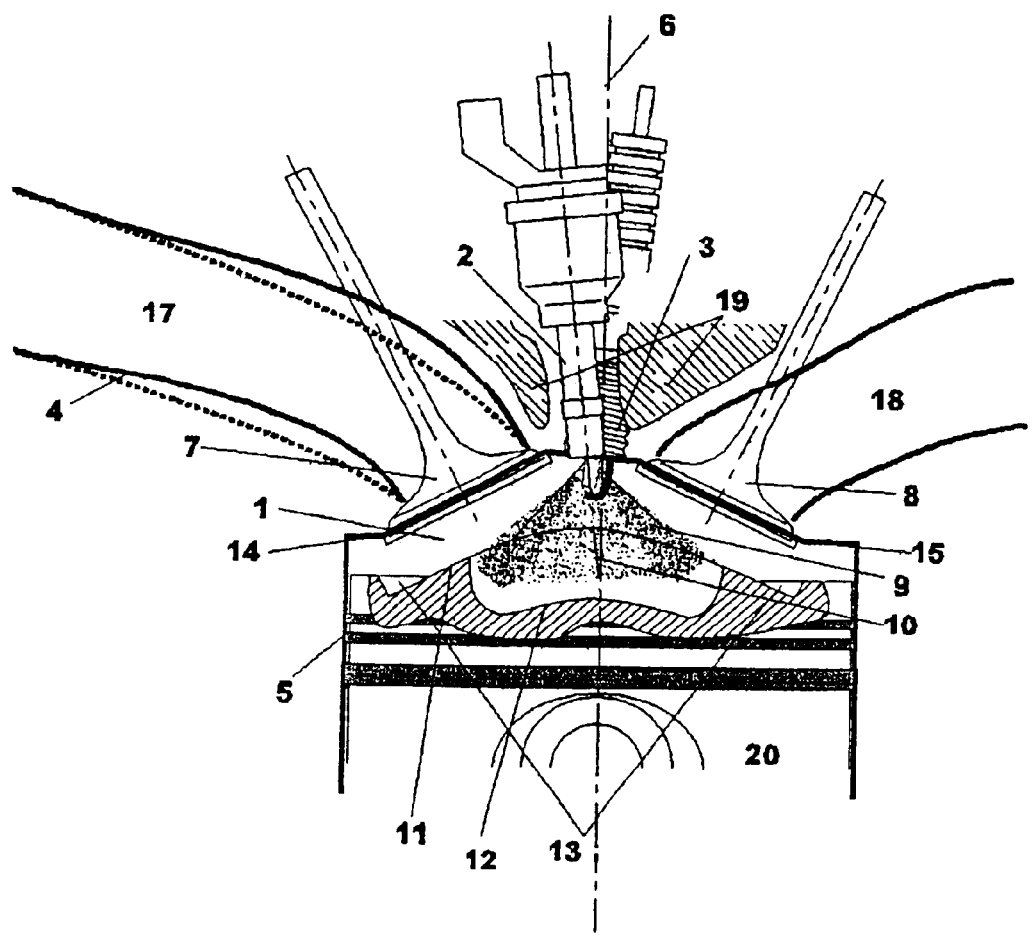
FIG. 1 shows a cross section through the inlet region of a cylinder of an internal combustion engine according to the invention.

In FIG. 1, one cylinder 5 of preferably a plurality of cylinders of a spark-ignition engine having direct fuel injection is illustrated. The walls of the cylinder 5 and the cylinder head, which is in the form of a pentroof, and the piston 20, which can move up and down in the cylinder 5, together form the combustion chamber 1. Two inlet valves 7 and two outlet valves 8, only one of each can be seen in FIG. 1, are preferably arranged in the cylinder head. The inlet valve 7 is seated at the end of induction port 17 and outlet valve 8 closes exhaust port 18.

The geometry of the inlet 4 is preferably fixed, i.e. there are no variable swirling devices or the like. The inlet 4 is merely constructed in such a manner that a pronounced movement of air is produced in combustion chamber 5, said movement comprising a strong tumbling flow and a weak swirling movement during induction. The tumbling flow is characterized by vortices having an axis of rotation perpendicular with respect to the cylinder axis 6, and is configured in such a manner that it breaks up into smaller turbulent flows during the compression. In contrast, the swirling movement, i.e., a vortex about the cylinder axis 6, is to be maintained during the compression to assist the intentional production of a stratified charge in the combustion chamber 1.

A fuel injector 2 and a spark plug 3 are arranged approximately in the center of the cylinder head. This arrangement permits a maximum diameter for the inlet valves 7 and the outlet valves 8.

The fuel injector 2 is configured in such a manner that it produces a special arrangement and shape of the injection volume 9 ensuring the best possible interaction with the spark plug 3. The injection volume 9 is defined as the region of space which is reached on a direct path by the liquid particles of the injected fuel. According to the invention, this injection volume 9 is shaped asymmetrically with regard to the distribution of the fuel jet within a cross section through the injection jet perpendicular with respect to the axis of the injection jet or of the injector 10. The asymmetry is specially designed in such a manner that the ignition location, i.e., the location of the electrodes of the spark plug 3, is localized within the entire envelope of the fuel spray which arises, with the result that said location is reliably reached by the evaporated fuel, but is never directly affected by the liquid fuel.

The interaction between the injected fuel jet and the movement of air which is produced by the inlet 4 (swirling movement) enables the evaporated fuel to be rapidly distributed.

The upper side of the piston 20 is distinguished by a specially configured profile 11 having a central trough 12 which serves for receiving the stratified charge produced by the injection device 2, and for deflecting the jet tip back into the central mixture volume in the event of a very far-reaching penetration of the jet. The trough 12 in the piston 20 furthermore permits a maximum free penetration of the fuel jet without impacting against a wall. Furthermore, the upper side of the piston has recesses 13 which provide space for the inlet valve 7 and the outlet valve 8 which permit variation in camshaft timing permitting clearance between piston and valves.

Squish surfaces are arranged on the side of the inlet 14 and of the outlet 15 and in the region of the roof to ensure better homogeneous combustion characteristics. The tumbling component of the movement of air produced by the inlet 4 in the cylinder is thereby converted better into turbulent flows to obtain an improved homogenization of the mixture and an increased rate of combustion.

Furthermore, the induction port 17 and the exhaust-gas port 18 are constructed and shaped such that they permit an optimized cooling water jacket 19 to be arranged about the fuel injector 2. Furthermore, there is open access of the air to the tip of the fuel injector 2 to permit proper cleaning in the region of the tip thereby preventing deposit formation.

FIG. 1 therefore shows a cylinder of an internal combustion engine having direct fuel injection and a central arrangement of the fuel injector 2 and of the spark plug 3 in a combustion chamber 1 having a roof, the injection device 2 injecting the fuel in the form of a distributed spray or spray mist and the inlet valves 7 providing an inlet flow into the cylinder 5 which produces an inclined swirling movement in the cylinder, and the inlet and outlet valves of the engine being actuated by a camshaft having VVT, making possible internal exhaust-gas recirculation. The fuel jet has an asymmetrical shape, in which the spark plug 3 is situated within the general envelope of the fuel spray which is produced, but the spark plug is prevented from being directly exposed to the impact of liquid fuel from the fuel jet.

As is illustrated in the figure, the internal combustion engine is preferably operated without any external exhaust-gas recirculation system.

I claim:

1. A combustion chamber at an internal combustion engine being formed by a cylinder, a piston, and a cylinder head, the combustion chamber comprising:

at least one air inlet (17) coupled to the combustion chamber which is arranged to provide a strong tumbling flow with a weak inclined swirling movement during induction of the inlet air in said combustion chamber to maintain a swirling movement during compression to assist formation of a stratified charge in said combustion chamber;

a fuel injector (2) arranged centrally on the upper side of the combustion chamber having open access of inducted air to a tip of said fuel injector to permit proper cleaning and surrounded by a coolant jacket (19) to reduce deposit formation, said fuel injector arranged for injecting a fuel jet into an injection volume (9), said injection volume being asymmetrical with regard to distribution of the fuel jet within a cross section through the fuel jet perpendicular to said fuel injector; and a spark plug (3) which is arranged centrally on the upper side of the combustion chamber wherein electrodes of said spark plug are situated outside said injection volume of said fuel injector.

2. The combustion chamber claimed in claim 1 wherein said electrodes are situated proximate to said injection volume.

3. The combustion chamber claimed in claim 1 wherein said electrodes are situated inside a volume occupied by evaporated fuel from said injection volume.

* * * * *